United States Patent [19]

Lilja et al.

[11] Patent Number: 5,188,808
[45] Date of Patent: Feb. 23, 1993

[54] METHOD FOR MIXING LIQUID, SOLIDS AND GAS AND FOR SIMULTANEOUSLY SEPARATING GAS OR GAS AND SOLIDS FROM THE LIQUID

[75] Inventors: Launo L. Lilja; Valto J. Mäkitalo; Stig-Erik Hultholm, all of Pori; Bror G. Nyman, Ulvila, all of Finland

[73] Assignee: Outokumpu Oy, Espoo, Finland

[21] Appl. No.: 675,444

[22] Filed: Mar. 26, 1991

[30] Foreign Application Priority Data

Apr. 4, 1990 [FI] Finland .................................. 901692

[51] Int. Cl.⁵ .............................................. B01F 7/00
[52] U.S. Cl. .................................. 422/229; 422/135; 422/228; 422/258; 422/259; 366/307; 366/320; 366/329
[58] Field of Search ............... 422/135, 228, 229, 258, 422/259; 366/307, 320, 329

[56] References Cited

U.S. PATENT DOCUMENTS

| | | | |
|---|---|---|---|
| 2,592,709 | 4/1952 | Kinnaird | 366/329 |
| 3,986,706 | 10/1976 | Giombini | 366/329 |
| 4,022,438 | 5/1977 | Shishido et al. | 259/107 |
| 4,242,002 | 12/1980 | Kawabata | 366/343 |
| 4,310,124 | 1/1982 | Schwing et al. | 241/46.11 |
| 4,472,063 | 9/1984 | Eickelmann | 366/129 |
| 4,628,391 | 12/1986 | Nyman et al. | 366/265 |
| 4,934,828 | 6/1990 | Janssen | 366/307 |

Primary Examiner—Robert J. Warden
Assistant Examiner—Christopher Y. Kim
Attorney, Agent, or Firm—Brooks Haidt Haffner & Delahunty

[57] ABSTRACT

The invention relates to a method for maintaining a continuous mixing extending throughout the transversal section of the reactor space in a liquid containing solids and gas, and for simultaneously separating gas or gas and solids from the liquid. The invention also relates to an apparatus whereby the mixing is maintained, and simultaneously at least one phase is removed from the liquid under agitation. In a particularly advantageous fashion the method and apparatus of the present invention are suited for the stirring of bioreactors, as well as to removing gas and solids from the said reactors.

6 Claims, 3 Drawing Sheets

METHOD FOR MIXING LIQUID, SOLIDS AND GAS AND FOR SIMULTANEOUSLY SEPARATING GAS OR GAS AND SOLIDS FROM THE LIQUID

The present invention relates to a method for maintaining a mixing extending throughout the transversal area of the reactor space in a liquid containing solids and gas, and for simultaneously separating gas or gas and solids from the liquid. The invention also relates to an apparatus for maintaining the mixing and for simultaneously removing at least one phase from the mixed liquid. In a particularly advantageous fashion the said method and apparatus are suited for removing solids from a reactor.

For mixing, there are generally used various types of blade impellers, which are sufficient for many mixing purposes. However, when it is necessary to expand the mixing throughout the whole of the liquid volume, the number of impellers suited for this purpose is fairly limited. The U.S. Pat. No. 4,648,973 describes an apparatus comprising two nested tubes. The liquid to be mixed flows downwards in the innermost tube, and this tube is provided with a blade impeller. Gas is conducted to the liquid, into the innermost tube, via. venturis, and this agitates the liquid. In the bottom part of the apparatus, the flowing direction of the liquid is reversed, and it starts flowing upwards in the outer tube, thereafter circulating back to the inner tube. In practice it has been proved that this apparatus creates a mixture extending throughout the liquid surface, but because of the reactions taking place in connection with the mixing it is important that the said apparatus should be constructed fairly high, which sets certain limits to the use of the arrangement. Further, if the aim is to separate from liquid another liquid or some solid material, the above described apparatus is in practice difficult to apply to the said purpose.

A fairly good mixture extending throughout the liquid surface is also created with various spiral impellers. Spiral impellers are often used for mixing highly viscous liquids. The most popular application in these cases has been an arrangement where the diameter of the impeller is at least 0.9 times as long as the diameter of the reactor. This type of impeller is described for instance in the U.S. Pat. No. 4,022,438, which specifies a stirring apparatus formed of two helical ribbon type blades. The impellers can also be composed of a single pipe or blade. Because the impeller already covers nearly all of the transversal surface of the reactor, baffles are not provided in the reactors anymore. Generally the width of the blade is 10% of the diameter of the helical impeller. Normally the helical impellers are arranged to rotate so that the created flow pattern proceeds down at the rims and up in the middle.

In the prior art there are also introduced mixer arrangements whereby the resident time of gas in the mixing zone can be affected. One such mixer arrangement based on controlled horizontal annular circulation is introduced in the FI patent application 874,627. By employing a special impeller with a high shear rate, as well as static baffles installed both vertically and horizontally, in the bottom part of the mixing zone there are created two annular toroids rotating to opposite directions. The agitation in these toroids is remarkably intensive, and therefore it is difficult to separate gas from solids in a controlled fashion by employing the said apparatus. It has also been suggested that the said apparatus be used in biotechnical applications such as fermentors, particularly in cases where high shear rates can be used, and it is mainly desired to prolong the residence of gas in the said fermentors. In this respect an intensified effect has been achieved by arranging several mixing zones on top of each other in high fermentor constructions.

According to the present invention, liquid is stirred in the reaction vessel without using high shear rates, which also enables the separation of either gas or solids or both from the liquid. The reactor space is particularly designed for this purpose, as well as the helical impeller used in the agitation. The reactor space can be divided into three different zones, with the reaction zone with the most intensive agitation in the middle. Therebelow is the separation zone calmed by a protective cone for separating solids. Respectively, above the reaction zone there is a separation zone pacified by a protective cone for separating gases. According to the invention, it is also possible to arrange several reactors on top of each other in order to carry a given chemical process as far as is necessary, or in order to start another chemical process after another chemical treatment. The invention also relates to the corresponding apparatus. The essential novel features of the invention are apparent from the appended patent claims.

The invention is below described with reference to the appended drawings, where

Figure 1:
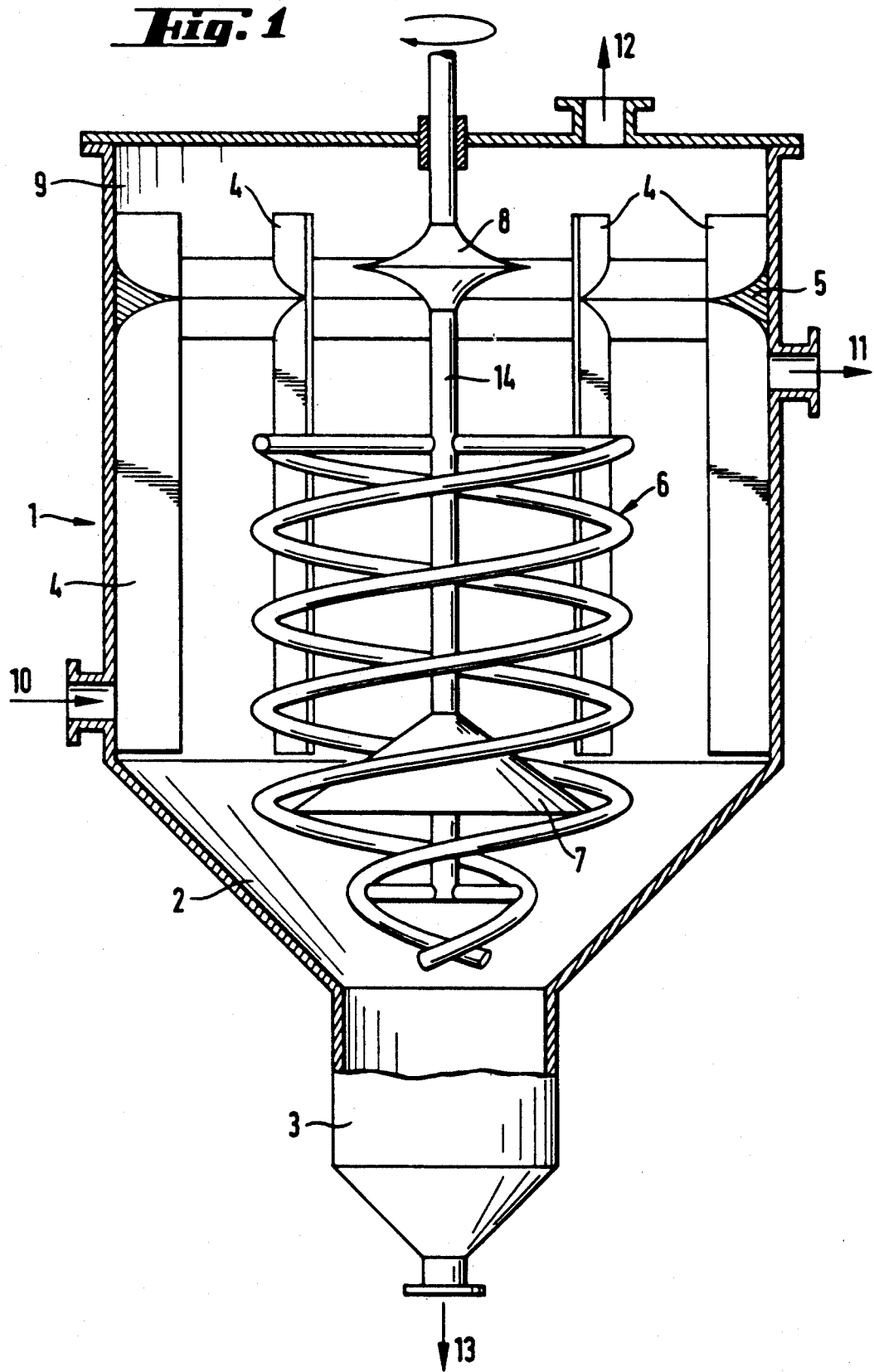
FIG. 1 is an illustration in principle of an apparatus of the invention.

According to FIG. 1, the mixing and separating apparatus of the invention comprises a cylindrical reactor 1, designed mainly for settling solids and separating gas, the bottom part 2 of which reactor is advantageously conical, in order to conduct the settled solids to the orifice of the outlet pipe; and a collecting zone 3 connected to the conical bottom part, baffles 4 provided in the reactor and a zone division ring 5, as well as the helical impeller 6 together with protective lane 7 and flow reverser 8 for protecting the separation zones. The task of the zone division ring 5 and the flow reverser 8 formed of two cones is to calm the top part 9 of the reactor for separating gas from liquid. The diameter of the collecting zone 3 is essentially smaller than the diameter of the cylindrical part of the reactor. The form of the collecting zone is advantageously cylindrical. The material to be mixed is conducted to the reactor, to the bottom part of the cylindrical space thereof, in the direction of arrow 10, and is discharged from the middle region of the cylindrical part of the reactor in the direction of arrow 11. The top part of the reactor is provided with means for discharging gas in the direction of arrow 12, and solids are discharged through the collecting zone, through the bottom part thereof, as is indicated by arrow 13. In most cases it is not economical to discharge solids continuously, but it is advantageous to allow it to be settled and discharged in batches. Therefore the collecting zone is necessary.

The baffles 4 are of normal structure and prevent horizontal rotation and the creation of vortex. The top and bottom surfaces of the zone division ring 5 are arched in a streamlined fashion, so that the ring is narrowed towards the center of the reactor. On the horizontal level, the ring advantageously extends from the impeller axis (which is arranged in the central point of the reactor with respect to the vertical direction), from the distance 0.75 times the radius of the reactor, as far as the cylindrical rim of the reactor.

The zone division ring 5 is installed in the reactor at the same height as the flow reverser 8 attached to the top part of the impeller. The flow reverser 8 is formed of two cones placed against each other so that the created surfaces are arched in a streamlined fashion. The protective cone 7 is a downwards widening cone as shown in the drawing figures.

It is essential for the helical or spiral impeller 6 that its diameter is within the region 0.50-0.75 times the diameter of the reactor. The impeller is advantageously formed of at least two tubular coils attached around the axis, as well as of their support rods. In the bottom part of the helical impeller, around the axis 14, there is arranged the protective cone 7 which prevents the material settled in the collecting zone of the reactor from rising back to stirred circulation. Respectively, in the top part of the helical impeller, around the axis, there is placed the flow reverser 8 which prevents the gas that has risen up to the top collecting space 9 from getting mixed back to the circulation of the reactor. Owing to the protective cone and flow reverser provided in the impeller, as well as to the baffles, the flow pattern of the liquid mixed in the reactor is formed so that it proceeds downwards in the middle and rises up along the sides of the reactor, in which case the created flow pattern helps the gas bubbles separated from the liquid to rise up, or the solid particles to settle down. Thus the liquid flow created in the reactor is ascending in the region which is larger than 0.7 times the radius of the transversal area of the cylindrical part of the reactor, and descending inside the said region.

Figure 2:
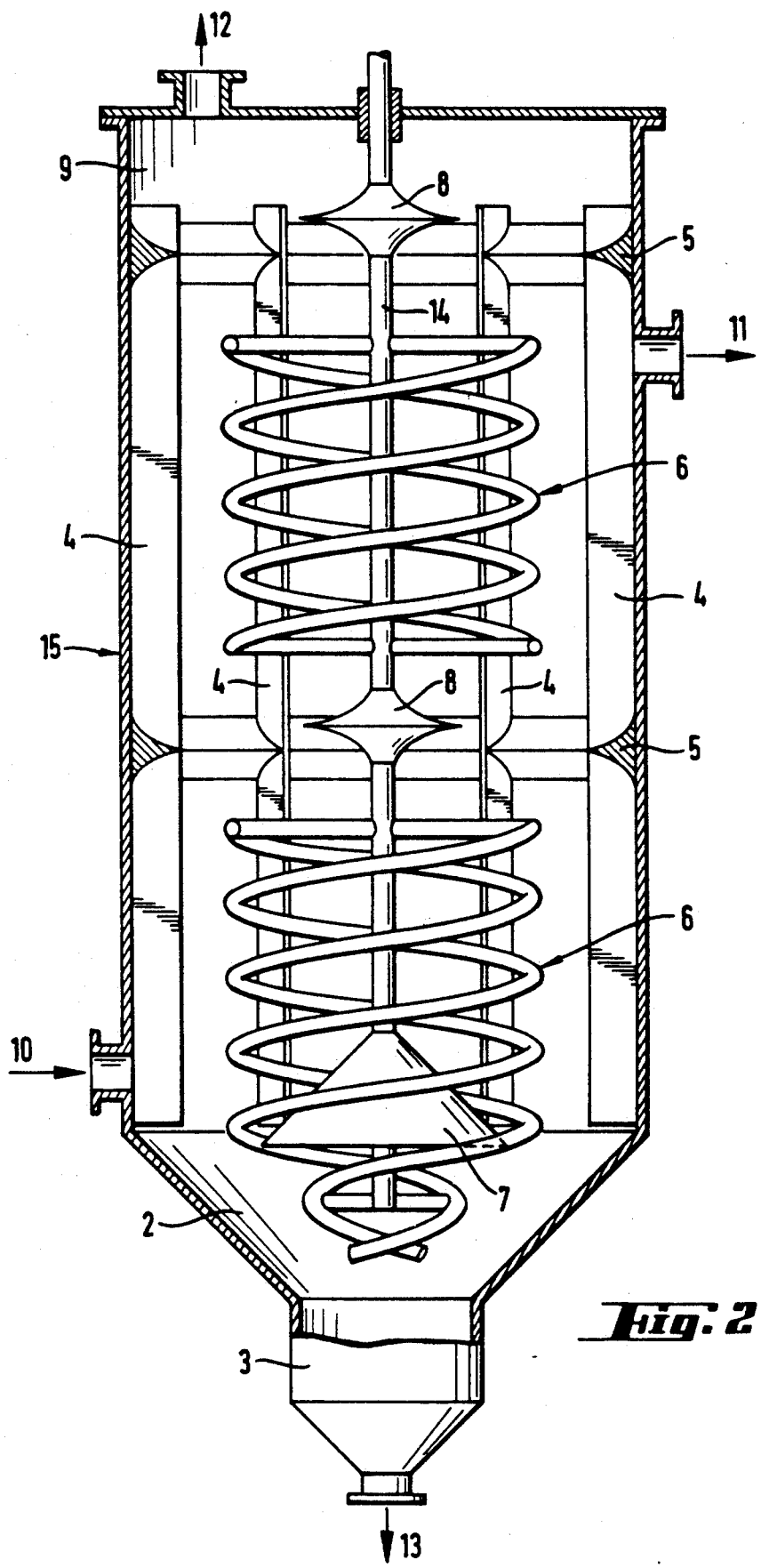
FIG. 2 is an illustration in principle of another apparatus of the invention, where the apparatus is composed of two units placed on top of each other.

According to FIG. 2, the reactor 15 can also be elongate in form, so that two impeller spirals 6 are located on top of each other on the same axis 14. The flow reverser 8 and the zone division ring 5 arranged in between the impeller spirals divide the reactor into vertical zones.

Figure 3:
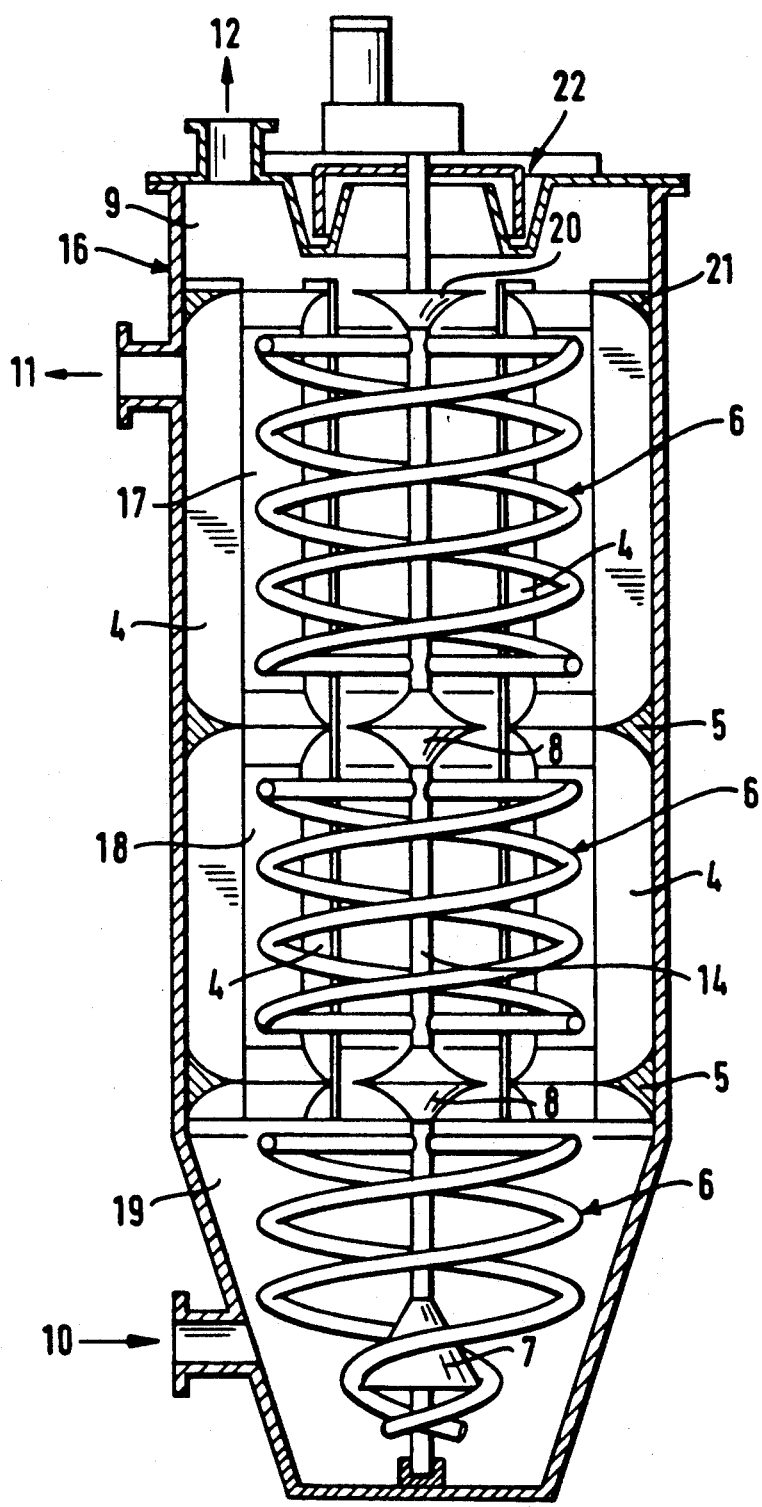
FIG. 3 is an illustration in principle of such an embodiment of the invention where several units are arranged on top of each other.

The reactor 16 of FIG. 3 is particularly suited for purposes where created gas, such as carbon dioxide, hydrocarbon or methane, is desired to be separated in a controlled manner. By employing the technique of the present invention, several mixing zones placed on top of each other can be provided in the said bioreactor. In way of example, let us mention a digestion reactor operated on anaerobic principles, to which reactor the sludge to be treated is fed through the conical bottom. The reactor is divided into three mixing zones 17, 18 and 19 by utilizing the zone division rings 5 provided on the circumference of the reactor, as well as the flow reversers 8 arranged on the axis 14, on the same level as the said zone division rings. Each zone is provided with a separate helical impeller 6, but all impellers are, however, arranged on the same axis which extends through the whole reactor. The lowest reactor zone is conical, and the impeller provided in this zone is of an upwards widening form; in the rest of the zones, the diameter of the impeller is the same throughout.

Owing to the combined effect of the spiral impellers, zone division rings, profiled flow reversers and baffles, there is created a vertical circulating flow proceeding in each mixing zone, and from this flow there is separated, in a controlled fashion, the created methane to the next, higher mixing zone. By utilizing this technique, the mutual stirring of the separate mixing zones can be adjusted as desired. Different micro-organism cultures can be maintained in the separate mixing zones by adjusting growth conditions favourable for each culture. The feeding of nutrient materials can be carried out differently, according to the mixing zones, while the grown micro-organisms, the biomass, are retained for a desired average period of time in their own mixing zones. Near the surface area it is also advantageous to use a one-sided zone division ring 20, and a one-sided flow reverser 21 in order to even out the discharge of gas separated from the circulation through the sludge lock 22, which belongs to the reactor. This arrangement also improves the flow pattern of the topmost zone.

In processes to which our invention is best suited it is important that by using low mixing power, it is possible in the reaction zone to give uniform treatment for large material flows containing solids and gas. Gases that are often found in the processes are formed in the chemical treatment itself, and so are the solids, or—if solids are already supplied in the feed—they are transformed in the treatment into a more rapidly settling form. One such process is an anaerobic digestion process, where the created gas is desired to be removed from the reaction circulation in a controlled manner. The treated sludge may contain some heavy, rapidly settling material, which should be separated from the rest of the sludge. As was founded above, this kind of material can be created in the reaction spaceas a result of intensive stirring, when particles collide with each other and are agglomerated together, or as a consequence of a chemical precipitation reaction. The apparatus of the present invention offers a possibility to remove the separated solids through the collecting zone located at the bottom.

A specific object of the present invention is to facilitate the enlarging of scale in bioreactors. It has been attempted to find improvements in cases where large material flows should be treated chemically, by employing plug flow techniques. In these cases the sludge under treatement is for example first fed into an unstirred shaft reactor, to the bottom part thereof, and the treated sludge is removed through the top part of the reactor. The problem now is to give a uniform treatment for the whole sludge flow, because in practice, particularly in large-scale apparatuses, it is difficult to create an ideal plug flow. Channelling takes place, and there are respectively created eddy currents in addition to possible nearly dead spaces, which all adds up to a nonhomogeneous material treatment.

Particularly in bioreactors, where the aim is to subject the material to two biotreatments in the same reactor by using different micro-organism cultures, it is important that the material is in the correct state while proceeding from one zone to another. A more uniform and respectively more controlled treatment can be achieved by employing the zone mixing of the present invention, which also provides a solution for the separation of gas and solids. As is shown in FIG. 2, two reaction zones can be separated from each other by using the two-sided flow reverser and the guide ring. This arrangement can also be used for raising the reaction rate of slowly proceeding reactions.

The above described stirred circulation flow arrangement can also be used for enhancing bioreactions in cases where it is desired to keep a high content of active biomass in circulation. Then it is often decisively important to remove created gases in order to adjust the bioreactions.

In the end, the described arrangement provides an alternative for the use of fluidized bed technique based on liquid flow. Because the said spiral stirring is fairly low in intensity, the question also is that of applications where the sludge density often is high, but the specific weight of the solids circulated in the reaction zone is not particularly large.

The introduced impeller with its flow cones can also be constructed in a large scale, and therefore it is advantageous to be used in active sludge tanks arranged for the treatment of wastewaters. The treatment can be aerobic or anaerobic in nature, but the regulation of the gas content of both processes is facilitated owing to a more uniform mixing. The content of the produced sludge also becomes more homogeneous thanks to improved stirring.

We claim:

1. An apparatus for maintaining continuous mixing in a liquid containing solids and gas, and for simultaneously separating gas or gas and solids from the liquid, which apparatus comprises a substantially vertically disposed, generally cylindrical reactor having a top part and a bottom part; a helical impeller installed inside the reactor and rotatable about a generally vertical axis of the reactor, said helical impeller comprising at least two spiraling tubes, a bottom part of which helical impeller is provided with a protective cone extending downwardly and outwardly from the axis of the reactor, and a top part of which helical impeller is provided with a flow reverser comprising two cones arranged vertically base to base around the reactor axis to; baffles arranged on inner walls of the reactor; at least one inwardly projecting zone division ring attached to the reactor inner walls at about the same vertical location as the flow reverser with respect to the reactor; and the top part of the reactor further having means for discharging gas; said helical impeller having a diameter which is 0.5–0.75 times the diameter of the reactor in the same horizontal plane.

2. The apparatus of claim 1, wherein the reactor is provided with has several helical impellers arranged on the same axis, and with zone division rings attached to the reactor wall, at about vertical location of a flow reverser of each impeller.

3. The apparatus of claim 1, wherein the top part of the reactor is cylindrical, and the bottom part of the reactor is conical, so that the diameter of the helical impeller increases upwards in.

4. The apparatus of claim 3 further comprising a collection zone for solids below the conical part of the reactor.

5. The apparatus of claim 1, wherein top and bottom surfaces of the zone division ring are curved, so that the ring is narrowed towards the center of the reactor.

6. The apparatus of claim 1, wherein the zone division ring extends from the distance 0.7 times a radius of a reactor in a horizontal plane as far as the cylindrical circumference of the reactor.

* * * * *

UNITED STATES PATENT AND TRADEMARK OFFICE
CERTIFICATE OF CORRECTION

PATENT NO. : 5,188,808
DATED : February 23, 1993
INVENTOR(S) : Launo L. Lilja, et. al.

It is certified that error appears in the above-indentified patent and that said Letters Patent is hereby corrected as shown below:

Column 2, line 45, "protective lane 7" should read --protective cone 7--.

Column 6, line 20, "impeller increases upwards in." should read -- impeller increases upwards.--

Signed and Sealed this

Eleventh Day of January, 1994

Attest:

BRUCE LEHMAN

*Attesting Officer*  *Commissioner of Patents and Trademarks*